Reuben D. Turner's Imp't in Apparatus for the Treatment of Alcoholic and other Liquids.

No. 111,791.

Patented Feb. 14 1871

Witnesses:
Fred. Haynes
A. F. Rabeau

Reuben D. Turner

UNITED STATES PATENT OFFICE.

REUBEN D. TURNER, OF NEW YORK, N. Y.

IMPROVEMENT IN APPARATUS FOR THE TREATMENT OF ALCOHOLIC AND OTHER SPIRITS

Specification forming part of Letters Patent No. 111,791, dated February 14, 1871.

*To all whom it may concern:*

Be it known that I, REUBEN D. TURNER, of the city, county, and State of New York, have invented a new and useful Improvement in Apparatus for the Treatment of Alcoholic and other Liquids, of which the following is a full, clear, and exact description, reference being had to the accompanying drawing, forming part of this specification, and in which—

Figure 1:
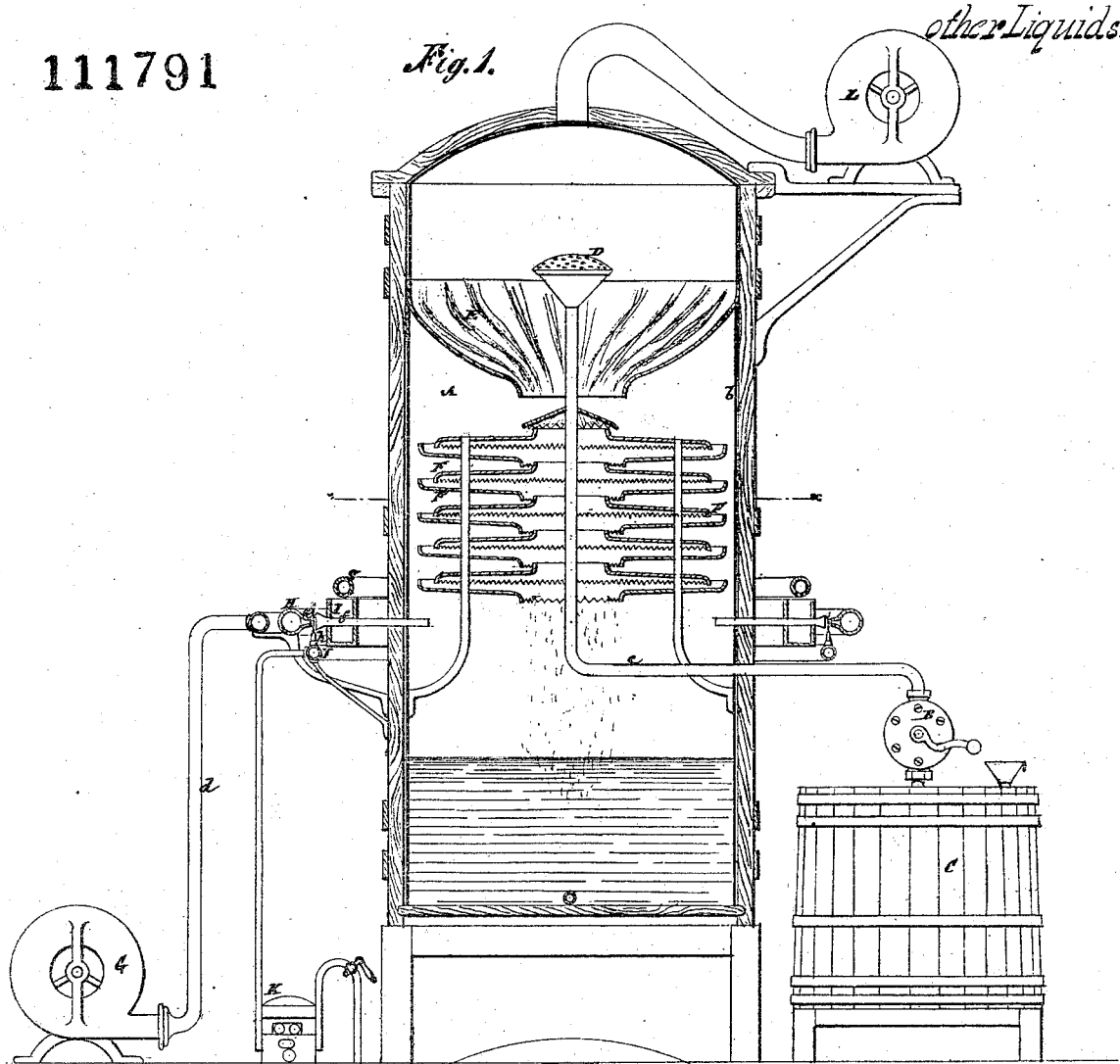
Figure 2:
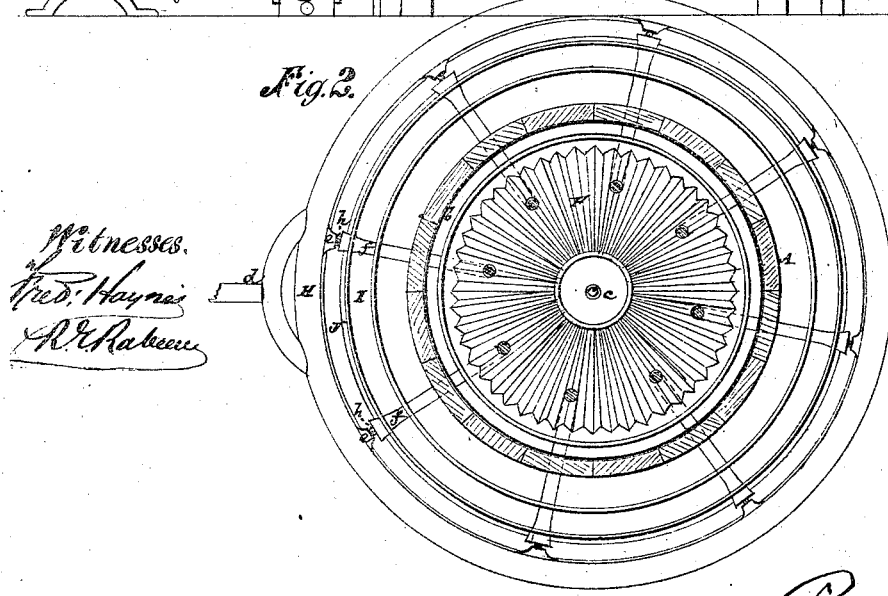

Figure 1 represents a sectional elevation of an apparatus embracing my improvement, and Fig. 2 a horizontal section of the same.

Similar letters of reference indicate corresponding parts.

My invention, although applicable under the same or a suitably-modified arrangement of its details, or certain of them, to the treatment of various liquids other than alcoholic, and to the manufacture of vinegar, or acidulation of other liquids, is especially designed for the aging or improving of wines and alcoholic liquids, such, for instance, as whisky and other spirits, and will here be described as so applied.

The leading principle of its action is the treatment of the liquid to the oxidizing influence or action of ozone or ozonized air; and, to this end I employ a process for obtaining said gas or air, which, in the abstract, forms no part of this invention, and which consists in passing a strong current of common air through a flame and collecting the products in a suitable receptacle, the ozone being formed and carried into the receptacle during the rapid action of the burning gases of the flame.

The invention embraces various combinations and arrangements of details for carrying this principle of action into effect; likewise includes a charred surface to the interior of the vessel in which the treatment takes place.

Referring to the accompanying drawing, A represents a close tank or vessel of any suitable form, and of any required height, in which the ozone or ozonized air and liquid to be created are brought in contact, as hereinafter described.

Said vessel may be made of different materials, and be lined with glass or other vitreous material to protect it from the destructive action of the ozone; but a simple and effective construction is to make it of wood or other suitable material, and to char or line it with charred wood on the inside, as at *b*, which charred surface secures the necessary protection.

The spirits to be treated may be drawn by a force-pump, B, from a vat or other vessel, C, and are discharged through a pipe, *c*, and rose D in a shower or divided form within the upper portion of the tank, from whence it passes by a corrugated bowl-shaped conductor, E, onto and over in succession a series of reverse cones or dish-shaped disks, F, provided with central openings, and which may be radially corrugated and serrated on their edges, to effect a spreaded or thin and divided distribution of the spirits over them in its passage down through the tank. The spirit, thus trickling or descending in a divided manner toward the base of the tank, is exposed to the action of an upward or opposite current or currents of ozone or ozonized air, not produced by electricity, but by the process hereinbefore referred to, under an advantageous combination or arrangement of devices. Thus, G is a fan or other blower for producing a forced blast or current of atmospheric air, which is conducted by a pipe, *d*, into a close distributing tube or belt, H, arranged to surround the tank, and provided at frequent or suitable distances apart with vents or nozzles *e* on the inside line of the belt, and facing in moderate proximity the same, flaring or bell-mouthed glass tubes *f*, which are made to pass through a water belt or trough, I, and from thence into the tank below the disks F.

The trough I may be supplied with water by a sprinkling tube or tubes, *g*, arranged to discharge the water onto the tubes *f*, for the purpose of securing to the latter their requisite coolness.

The flame through which the air passes in its way from the nozzles *e* to the tubes *f*, to effect the production of the ozone, may be a gas flame or flames from suitable burners *h*, arranged to occupy a transverse and intermediate though lower position relatively to the nozzles *e* and tubes *f*, which burners may project from a gas pipe or belt, J, supplied from a gasometer, *k*, or otherwise.

A suction-fan, L, may be arranged to connect with the top of the tank, to assist in sustaining the necessary current or currents of air through the burning gas for obtaining ozone or ozonized air, and to retard or hold the liquid under treatment in suspension, as it were, within the tank, or otherwise, to effect a more thorough treatment of the spirits by the ozone.

While in some cases it may be advisable to use both the blast and suction fans or devices G and L, in other cases it may be necessary or advisable to use but the one of them.

The treated liquor is drawn or run off, as required, from the bottom of the tank A by any suitable devices.

What is here claimed, and desired to be secured by Letters Patent, is—

1. The combination of the air-blast, vents, or nozzles e, the burners h, the ozone-tubes f, exposed to the cooling action of water on their exterior, with the tank A and its rose or sprinkler D, and distributing-plates or devices, for spreading or dividing the liquid in its descent within the tank under exposure to the ozone or ozonized air, substantially as specified.

2. The combination, with the elements recited in the preceding claim, of the suction-fan or device L, essentially as specified.

3. In combination with the ozone-distributing devices or tubes f, the tank A, provided with a charred lining or interior surface, b, substantially as described.

REUBEN D. TURNER.

Witnesses:
FRED. HAYNES,
R. E. RABEAU.